US012248902B2

(12) United States Patent
Singh et al.

(10) Patent No.: US 12,248,902 B2
(45) Date of Patent: Mar. 11, 2025

(54) SYSTEM AND METHOD FOR PROVIDING FREIGHT VISIBILITY (71) Applicant: MOTIVE TECHNOLOGIES, INC., San Francisco, CA (US)

(72) Inventors: Shashi Shekhar Singh, Burnaby (CA); Yuvaraj Thiagarajan, Vancouver (CA); Charles Edmund Julius, Los Angeles, CA (US); Amit Goldy, Goldy (CA); Henry Phuong, Vancouver (CA)

(73) Assignee: MOTIVE TECHNOLOGIES, INC., San Francisco, CA (US)

( * ) Notice: Subject to any disclaimer, the term of this patent is extended or adjusted under 35 U.S.C. 154(b) by 85 days.

(21) Appl. No.: 17/748,539

(22) Filed: May 19, 2022

(65) Prior Publication Data

US 2023/0281553 A1 Sep. 7, 2023

Related U.S. Application Data (60) Provisional application No. 63/316,278, filed on Mar. 3, 2022.

(51) Int. Cl.
*G06Q 10/0833* (2023.01)
(52) U.S. Cl.
CPC ................ *G06Q 10/0833* (2013.01)
(58) Field of Classification Search
CPC .................................. G06Q 10/0833
See application file for complete search history.

(56) References Cited

U.S. PATENT DOCUMENTS

2017/0344941 A1* 11/2017 Thakur ............... G06Q 10/0834
2019/0212149 A1* 7/2019 Ho ....................... G01C 21/3453
2019/0385121 A1* 12/2019 Waliany ................... G06F 9/54

OTHER PUBLICATIONS

Jemin Patel, Load Balancing Scheduling Algorithm for Concurrent Workflow, 2018, p. 311-326 (Year: 2018).*
International Search Report and Written Opinion to corresponding International Application No. PCT/US23/63544, mailed Sep. 20, 2023.

* cited by examiner

*Primary Examiner* — Ibrahim N El-Bathy
(74) *Attorney, Agent, or Firm* — George David Zalepa; Greenberg Traurig, LLP (57) ABSTRACT In some aspects, the techniques described herein relate to a method including: receiving a network request from a computing device, the network request including a company identifier, an estimated time of arrival (ETA), and a location of interest (LOI); computing a first score based on an actual ETA of at least one vehicle associated with the company identifier; computing a second score based on an hours of service value associated with a driver of the at least one vehicle; computing a third score based on a direction of the at least one vehicle; and aggregating the first, second, and third score to generate a total matching score.

20 Claims, 7 Drawing Sheets

SYSTEM AND METHOD FOR PROVIDING FREIGHT VISIBILITY

CROSS-REFERENCE TO RELATED APPLICATIONS

This application claims the benefit of U.S. Provisional Pat. Appl. No. 63/316,278 filed Mar. 3, 2022, and incorporated by reference in its entirety.

BACKGROUND

In 2015, nearly 18.1 billion tons of goods trillion were moved along the U.S. National Transportation Network. This number is projected to grow to 27 billion tons by 2045. Despite this large volume of goods transported, most interested parties have limited or no visibility regarding the status of en route goods.

BRIEF SUMMARY

In some aspects, the techniques described herein relate to a method that includes receiving a network request from a computing device, the network request including a company identifier (ID), an estimated time of arrival (ETA), and a location of interest (LOI); computing a first score based on an actual ETA of at least one vehicle associated with the company ID; computing a second score based on an hours of service value associated with a driver of the at least one vehicle; computing a third score based on a direction of the at least one vehicle; and aggregating the first, second, and third score to generate a total matching score.

In some aspects, the techniques described herein relate to a method wherein the LOI includes a latitude and longitude pair.

In some aspects, the techniques described herein relate to a method wherein computing the first score includes retrieving an actual ETA of the at least one vehicle using a current location of the at least one vehicle and the LOI, generating a time window using the actual ETA and the current time, determining if the estimated ETA is within the time window, and generating the first score based on determining if the estimated ETA is within the time window.

In some aspects, the techniques described herein relate to a method wherein computing the second score includes determining if the actual ETA falls within the remaining driving time available to the driver based on their hours of service.

In some aspects, the techniques described herein relate to a method wherein computing the third score includes: retrieving historical location data for the at least one vehicle; generating a plurality of compass bearings based on the historical location data; comparing each of the plurality of compass bearings to a current compass bearing of the at least one vehicle; and using results of the comparing to generate a third score.

In some aspects, the techniques described herein relate to a method wherein generating a plurality of compass bearings based on the historical location data includes sampling the historical location data to obtain a set of coordinates and generating the plurality of compass bearings based on the set of coordinates.

In some aspects, the techniques described herein relate to a method wherein generating a plurality of compass bearings based on the historical location data includes computing the plurality of compass bearings based on linear lines between respective vehicle locations and the LOI.

In some aspects, the techniques described herein relate to a method wherein generating a plurality of compass bearings based on the historical location data includes using an Open Source Routing Machine (OSRM) API to compute distances between coordinates in the historical location data and coordinates of a destination and determining if the at least one vehicle is moving toward the LOI.

In some aspects, the techniques described herein relate to a non-transitory computer-readable storage medium for tangibly storing computer program instructions capable of being executed by a computer processor, the computer program instructions defining steps of receiving a network request from a computing device, the network request including a company ID, an ETA, and an LOI; computing a first score based on an actual ETA of at least one vehicle associated with the company ID; computing a second score based on an hours of service value associated with a driver of the at least one vehicle; computing a third score based on a direction of the at least one vehicle; and aggregating the first, second, and third score to generate a total matching score.

In some aspects, the techniques described herein relate to a non-transitory computer-readable storage medium, wherein the LOI includes a latitude and longitude pair.

In some aspects, the techniques described herein relate to a non-transitory computer-readable storage medium, wherein computing the first score includes retrieving an actual ETA of the at least one vehicle using a current location of the at least one vehicle and the LOI, generating a time window using the actual ETA and the current time, determining if the estimated ETA is within the time window, and generating the first score based on determining if the estimated ETA is within the time window.

In some aspects, the techniques described herein relate to a non-transitory computer-readable storage medium, wherein computing the second score includes determining if the actual ETA falls within a cycle time represented in the hours of service of the driver.

In some aspects, the techniques described herein relate to a non-transitory computer-readable storage medium, wherein computing the third score includes: retrieving historical location data for the at least one vehicle; generating a plurality of compass bearings based on the historical location data; comparing each of the plurality of compass bearings to a current compass bearing of the at least one vehicle; and using results of the comparing to generate the third score.

In some aspects, the techniques described herein relate to a non-transitory computer-readable storage medium, wherein generating a plurality of compass bearings based on the historical location data includes sampling the historical location data to obtain a set of coordinates and generating the plurality of compass bearings based on the set of coordinates.

In some aspects, the techniques described herein relate to a non-transitory computer-readable storage medium, wherein generating a plurality of compass bearings based on the historical location data includes computing the plurality of compass bearings based on linear lines between respective vehicle locations and the LOI.

In some aspects, the techniques described herein relate to a non-transitory computer-readable storage medium, wherein generating a plurality of compass bearings based on the historical location data includes using an OSRM API to compute distances between coordinates in the historical location data and coordinates of a destination and determining if the at least one vehicle is moving toward the LOI.

In some aspects, the techniques described herein relate to a device that includes a processor configured to receive a network request from a computing device, the network request including a company ID, an ETA, and an LOI; compute a first score based on an actual ETA of at least one vehicle associated with the company ID; compute a second score based on an hours of service value associated with a driver of the at least one vehicle; compute a third score based on a direction of the at least one vehicle; and aggregate the first, second, and third score to generate a total matching score.

In some aspects, the techniques described herein relate to a device, wherein computing the first score includes retrieving an actual ETA of the at least one vehicle using a current location of the at least one vehicle and the LOI, generating a time window using the actual ETA and the current time, determining if the estimated ETA is within the time window, and generating the first score based on determining if the estimated ETA is within the time window.

In some aspects, the techniques described herein relate to a device, wherein computing the second score includes determining if the actual ETA falls within a cycle time represented in the hours of service of the driver.

In some aspects, the techniques described herein relate to a device wherein computing the third score includes: retrieving historical location data for the at least one vehicle; generating a plurality of compass bearings based on the historical location data; comparing each of the plurality of compass bearings to a current compass bearing of the at least one vehicle; and using results of the comparing to generate the third score.

DETAILED DESCRIPTION

The example embodiments provide a freight visibility platform that gives interested parties real-time visibility into shipping loads transported by vehicles (e.g., tractor-trailers, ships, etc.).

As used herein, an interested party refers to anyone representing the shipping party, such as brokers, shippers, and anyone else using the freight visibility platform. For example, in the trucking industry, a shipper is the party who wants to transport goods, and a broker is a middle party between the shipper and carriers. The example embodiments provide an application programming interface (API) that is easy to understand and consume by interested parties. This API can allow an interested party to associate a load with a vehicle carrying it, as well as to detect and flag incorrect load-to-vehicle associations. In an embodiment, the API further allows interested parties to pull the location of the vehicle carrying a load. In an embodiment, the API further provides a push mechanism to receive locations on their configured endpoints. The API also includes minimal overhead to perform authentication, authorization, and similar tasks.

In addition to interested parties, carriers may also access the freight visibility platform. As used herein, a carrier refers to a company that owns one or more fleets of vehicles and provides transportation. The example embodiments access carriers' data and accommodate the carriers' data security requirements. As such, the example embodiments provide full visibility and control of who has permission to access their data. The example embodiments also provide complete visibility into who is accessing their data and how often it is accessed.

Further, the example embodiments include administrative processes to ensure the reliable and accurate operation of the system. For example, the example embodiments can utilize rate-limiting to prevent abuse and system overloads. The example embodiments can also provide permission-override access for an internal support team. Finally, the example embodiments can also store historical tracking data to serve billing and other business use cases (e.g., analytics).

Figure 1:
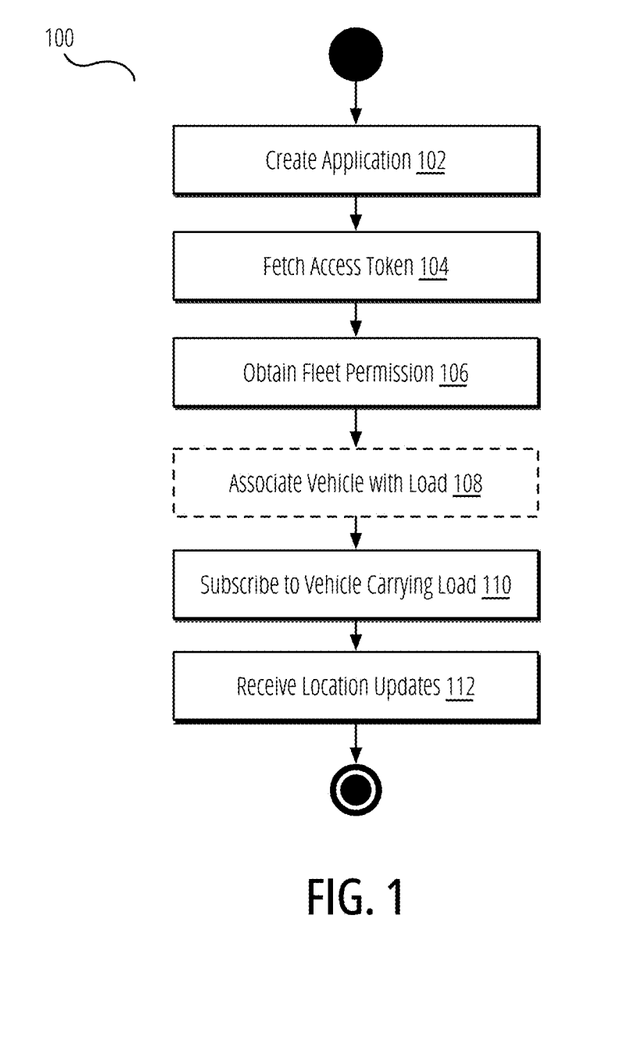
FIG. 1 is a flow diagram illustrating a broker workflow according to some of the example embodiments.

FIG. 1 is a flow diagram illustrating a broker workflow according to some of the example embodiments. As described above, a broker can comprise any entity situated between shippers and carriers in a transportation network. In an embodiment, brokers can provide freight visibility services via applications (e.g., mobile or desktop applications) that integrate with the API of the example embodiments.

In step 102, method 100 can include creating an application. In an embodiment, the application can comprise a mobile application or similar application deployed through an "app store" or a similar environment associated with the example embodiments.

In step 104, method 100 can include fetching an access token for one or more fleets of vehicles. In some embodiments, the access token can comprise an OAuth token (e.g., OAuth 2.0 token). In general, OAuth tokens store various states (e.g., authorization grants, access tokens, refresh tokens, etc.) required by the one or more fleets that install the application created in step 102.

In some embodiments, method 100 can include obtaining access tokens for each individual fleet using the example embodiments. In an alternative embodiment, method 100 can include utilizing a proxy fleet when establishing access tokens. In general, a proxy fleet comprises a reference to one or more actual fleets. During onboarding, each broker utilizing method 100 can be assigned a proxy fleet. Brokers can then add or remove actual fleets to their proxy fleet. Then, in step 104, method 100 only must retrieve a single access token for the proxy fleet. By using a proxy fleet in lieu of individual fleets, method 100 can reduce the number of states a broker needs to manage while still securing the APIs via access tokens for security and consistency. While a single proxy fleet is described, the disclosure is not limited as such. For example, a broker can be associated with multiple proxy fleets, each in turn associated with multiple actual fleets.

In step 106, method 100 can include obtaining fleet permissions in response to the request to obtain an access token. Details of this step are provided in FIG. 2, the disclosure of which is not repeated herein.

In step 108, method 100 can include optionally associating a vehicle with a load.

In an embodiment, the example embodiments include an API allowing brokers to determine a vehicle most likely associated with a load when given an LOI (e.g., the load's pickup or drop-off location). The association API serves as a tool for affirming the accuracy of the electronic logging device (ELD) ID or other tracking ID a broker may have received against their loads, either offline or over other channels.

In step 110, method 100 can include subscribing to a vehicle carrying a load. In some embodiments, a broker can subscribe to a vehicle to track it. Subscriptions can be managed using Hypertext Transfer Protocol (HTTP) POST and PUT subscribe APIs. Both pull and push mechanisms may work within the time window of an active subscription. In step 112, method 100 can include periodically receiving location updates via, for example, WebHook integrations, as discussed in more detail herein.

Figure 2:
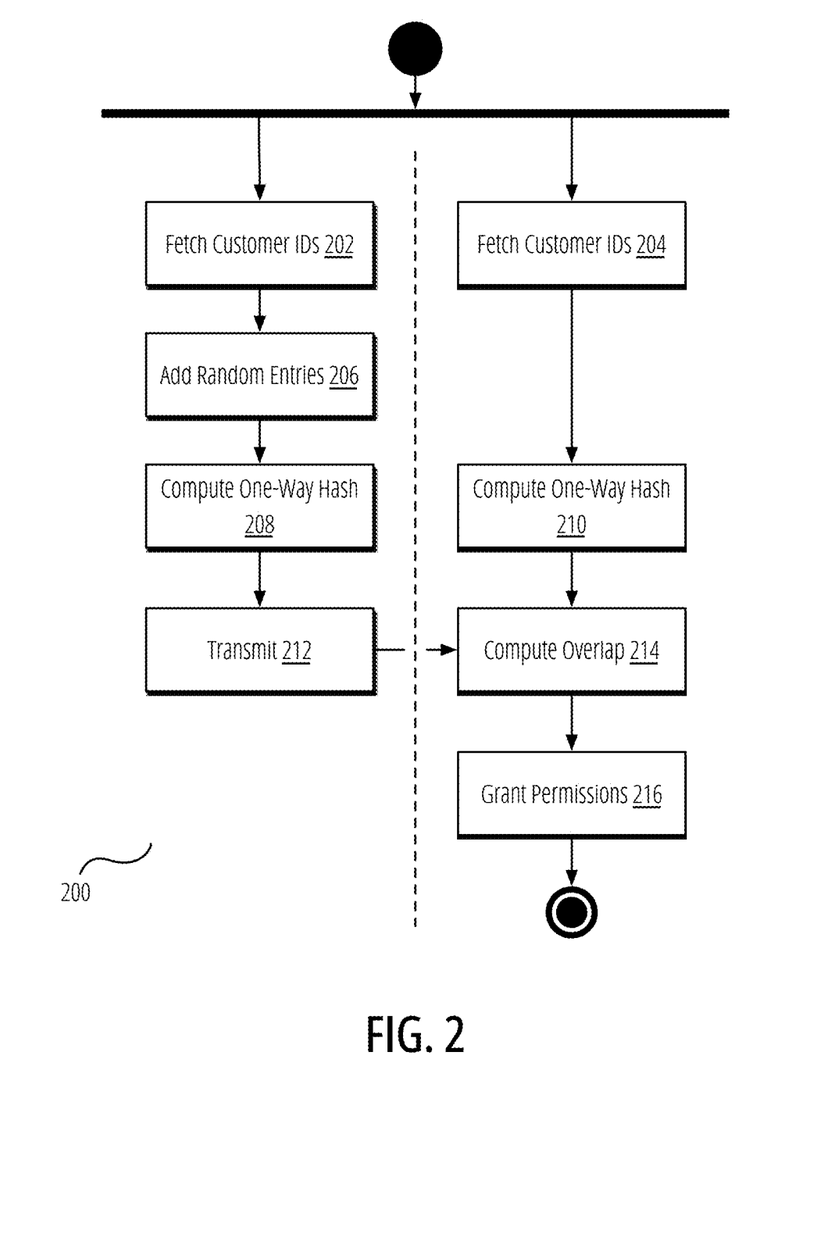
FIG. 2 is a flow diagram illustrating a method for granting permissions to a broker according to some of the example embodiments.

FIG. 2 is a flow diagram illustrating a method for granting permissions to a broker according to some of the example embodiments.

When onboarding brokers (e.g., intermediaries in a transportation network), carriers may have pre-existing relationships with such brokers and, as such, have previously granted permissions to such brokers. Thus, a system or method that merely assigns permissions between brokers and carriers will result in duplicated permissions if the broker is already permitted to track these fleets' vehicles (perhaps using an intermediary visibility provider). Method 200 leverages this overlap to apply the same permission grants in the system during onboarding. Method 200 specifically finds mutual partners between the system and a broker without disclosing either party's entire customer base or even the size of the customer base. As illustrated in FIG. 2, steps to the left of the dashed line may be performed by a broker, while steps to the right may be performed by the system or platform.

In step 202, a broker fetches a list of customer IDs it desires to track. Similarly, in step 202, the platform or system fetches a list of customer IDs known to the system. In some embodiments, the customer IDs can comprise U.S. Dept. of Transportation (DOT) numbers assigned to carriers. Notably, the customer IDs in step 202 may partially overlap with the customer IDs in step 204, as will be discussed.

In step 206, a broker adds random entries to the list of fetched customer IDs. In some embodiments, the broker adds random numbers to eliminate any risk of leaking the size of the broker's customer base. In some embodiments, step 206 can be executed after step 208.

In step 208, the broker computes a one-way hash of each number (i.e., the customer IDs and random numbers). In some embodiments, the one-way hash can comprise a SHA-256, MD5, or similar one-way hash. The use of a one-way hash eliminates the possibility of recomputing customer IDs given the hashes. If step 206 is implemented after step 208, the random entries can comprise random hash values.

In step 210, the platform likewise computes hashes of all customer IDs. In some embodiments, the platform can pre-compute customer ID hashes.

In step 212, the broker transmits its list of hashed values (e.g., customer IDs and random entries) to the platform. In response, in step 214, the platform computes the overlap between the broker's hashes and the hashes computed in step 210 to identify the known customer IDs. In step 216, the platform grants permissions for the broker to access data associated with the known customer IDs.

In some embodiments, these permissions can be long-lived for each broker. As described in FIG. 1, a broker can initiate method 200 upon uploading an application to an app store or similar environment, and permissions can be set during the approval process. In some embodiments, a fleet manager can grant a broker the permission to track loads on any of their fleet's vehicles by installing the broker's application, available in the app store. Removing the application can likewise revoke the permission.

Figure 3:
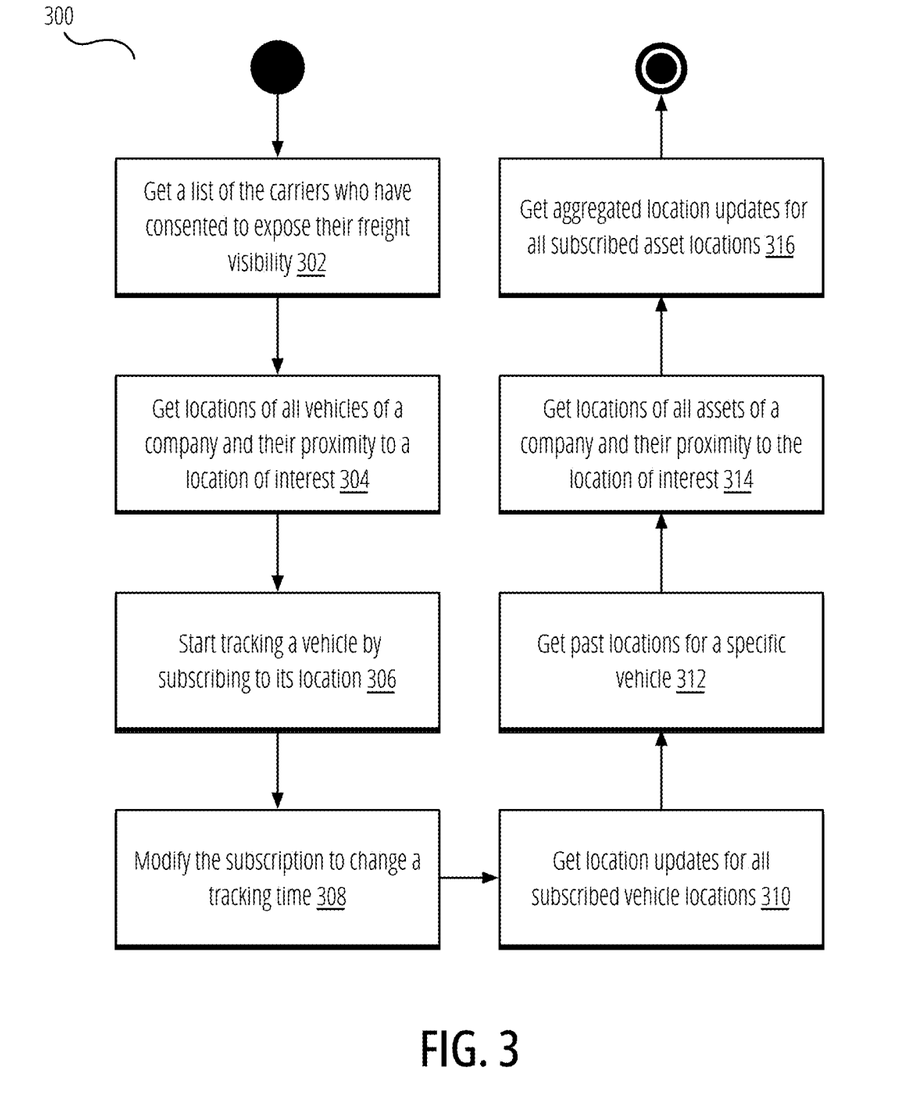
FIG. 3 is a flow diagram illustrating a method for tracking vehicle locations according to some of the example embodiments.

FIG. 3 is a flow diagram illustrating a method for tracking vehicle locations according to some of the example embodiments.

In step 302, method 300 can include getting a list of the carriers who have consented to expose their freight visibility.

In an embodiment, brokers can use method 300 to track the vehicle locations of their respective carriers, provided that the carriers have created permissions for the broker to track the carrier's vehicles. As illustrated, method 300 can begin by retrieving a list of all carriers who have integrated freight visibility and consented to offer the broker visibility. A broker can load tracking events for these carriers.

In some embodiments, the broker can issue an HTTP GET request to retrieve a list of companies. In an embodiment, the response contains a list of carriers the broker can track. In an embodiment, for each carrier, two IDs can be provided: a company ID (e.g., "KT5124848") or a list of U.S. DOT IDs (e.g., federal IDs for a given carrier). In some embodiments, the response can include both types of IDs. In some embodiments, a server can query a database of company IDs and DOT IDs to generate the response. In some embodiments, additional data stored in the database, such as a street address, city, state, and zip code, can be provided.

In step 304, method 300 can include getting the locations of all vehicles of a company and their proximity to an LOI.

In an embodiment, a given broker may be aware of a load that needs to be picked up at an estimated time and specific location but can be unsure which vehicle to track for this purpose. In step 302, method 300 identifies the carriers that enabled tracking capabilities to a given broker. In an embodiment, step 304 can include selecting a given carrier (e.g., via a company ID) and identifying which of their vehicles is most likely to meet the broker's criteria.

In step 304, method 300 can include issuing an HTTP GET request that indicates the carrier whose vehicle locations the broker wants by providing either the company IDs or DOT IDs (both retrieved in step 302) to specify the carrier. In some embodiments, the request can also include pickup and drop-off locations using latitude and longitude or another type of geographic coordinate system. In some embodiments, the request can also include an estimated time for the carrier to pick up the load.

In response to the request in step 304, a server processing the API request can compare a fleet's vehicles' likelihood of reaching the destination defined in the request within the time range in the request.

In some embodiments, when brokers track a load to a vehicle, sometimes the ELD ID they receive, or any other tracking ID they may receive, against a load is incorrect. In some embodiments, method 300 can provide a mechanism for brokers to verify that the ELD ID (or any other tracking ID) they receive against a load is accurate. To this end, method 300 can provide an association API. Using the association API, a broker can provide a fleet ID and a location of interest, such as a load's pickup location, and gain visibility into which one of that fleet's vehicles is most likely to have picked up that load. If there is no potential match, they can flag the tracking ID as bad.

In a first embodiment, the association API can compute the distances of all (or some of) a fleet's vehicles to the given point of interest and return them ordered by their proximity to the given location or LOI. In some embodiments, when the association API is called, it can compute and cache the distances of all vehicles from the given location for a fixed duration (e.g., three hundred seconds). All successive pages can then be served from the cache. In some embodiments, the cache key can be derived from the identity of the broker, the fleet, and the given location. In some embodiments, the current location information of a vehicle can be read from the cache. The response of the API may also include historical locations of vehicles, depending on a broker-specific configuration. In some embodiments, this information can be stored in and read from a database such as a key-value database.

In a second embodiment, the algorithm takes into consideration the following factors: a truck-based ETA, an hours of service (HOS) cycle value for each driver, and the current direction of the vehicle relative to the location included in the request. Each data point can be used to compute a matching score, and the matching scores are then aggregated to form a total matching score.

Figure 6:
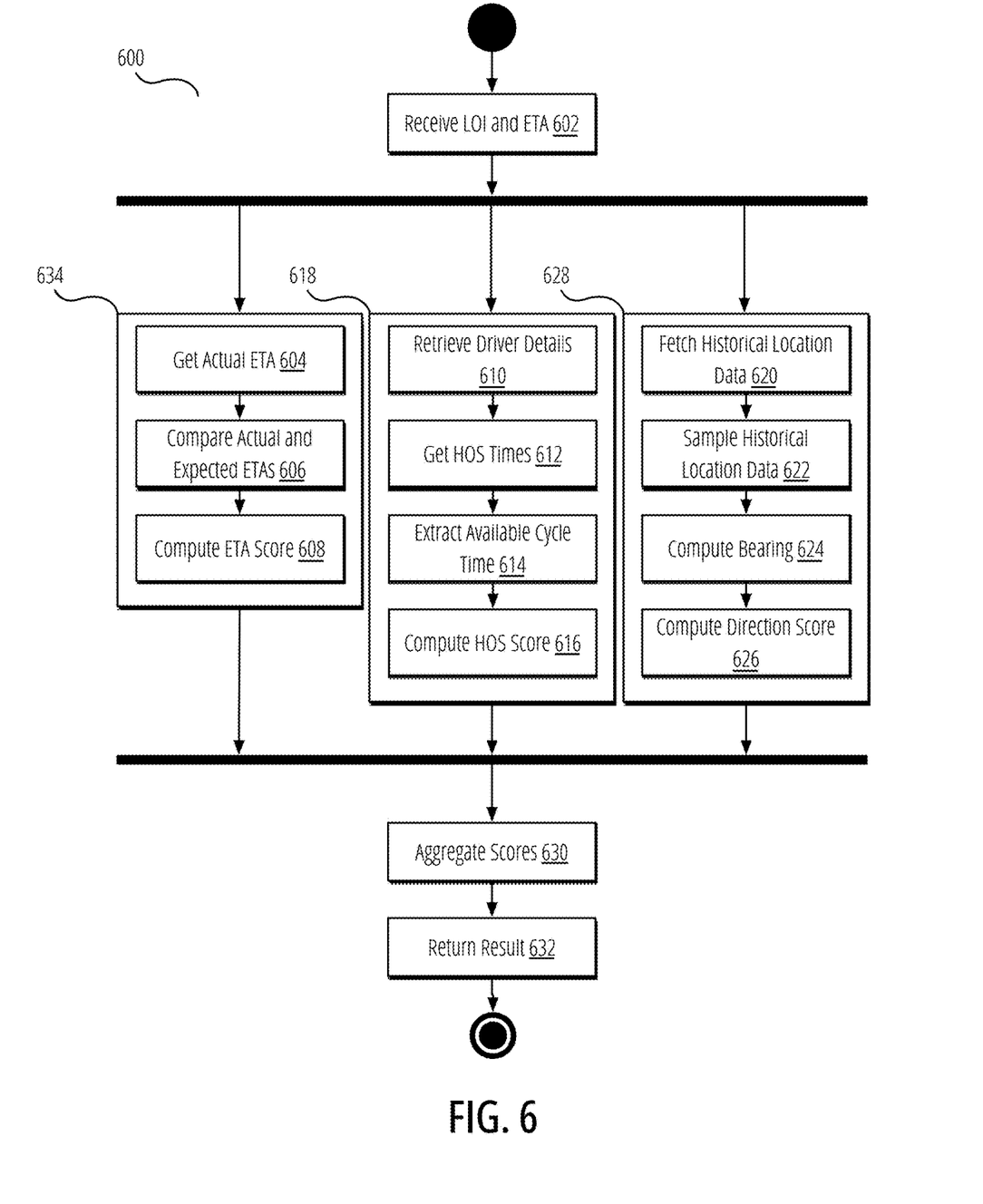
FIG. 6 is a flow diagram illustrating a method for generating a total matching score according to some of the example embodiments.

FIG. 6 is a flow diagram illustrating a method for generating a total matching score according to some of the example embodiments.

In step 602, method 600 can include receiving a company ID, an ETA, and an LOI from a broker via, for example, an API call. In some embodiments, the company ID can be optional. In such a scenario, method 600 can be executed for all potential vehicles, and the result in step 632 can comprise an array of total matching scores for each vehicle. In some embodiments, the LOI can comprise a latitude and longitude, although other geographic coordinate systems can be used. In some embodiments, the ETA can comprise a value representing the time a vehicle is expected at the LOI. After step 602, method 600 can execute subprocess 634, subprocess 618, and subprocess 628. In some embodiments, method 600 can execute these subprocesses in parallel or in sequence.

In step 604, method 600 can include obtaining an actual ETA for a vehicle associated with the company ID (if provided). In an embodiment, method 600 can include retrieving a current vehicle location from a tracking database that continuously updates the locations of vehicles. Next, method 600 can use the current vehicle location as an origin point and the LOI included in the API request to compute the actual ETA for a given vehicle. In some embodiments, method 600 can query a track and trace service that provides ETAs based on tracked data of vehicles in motion. Details of the operation of such a service are not included for the sake of clarity, and any service that provides such data can be used. In some embodiments, the track and trace service can return an actual duration and distance for the trip.

In step 606, method 600 can include comparing the expected ETA received from the broker in step 602 with the actual duration retrieved in step 604. Specifically, the actual duration can be used to compute a time window (e.g., between the current time and the current time plus the actual duration). Step 606 can comprise determining if the expected ETA falls within this time window.

In step 608, method 600 can include computing an ETA score based on the comparison in step 606. In some embodiments, the ETA score can be computed by determining a Boolean result of whether the estimated ETA falls within the window computed in step 606. Thus, the ETA score can comprise either one or zero. Alternatively, method 600 can compute a continuous likelihood percentage based on the distance between the expected ETA and the actual ETA. For example, a probability distribution or other type of distribution can be used to convert the delta between the expected ETA and the actual ETA and a value between, for example, zero and one.

In other embodiments of method 600, the ETA score can be a fixed number (e.g., 0.5 or 50%). In this scenario, method 600 can determine if the expected ETA falls within the window defined in step 606. If so, the ETA score is always set at 0.5 (50%). If not, the ETA score is always set at 0.0 (0%).

In step 610, method 600 can include extracting a driver ID for a given vehicle. In some embodiments, if no driver ID can be identified, method 600 can proceed directly to step 630 and set the HOS score as zero.

In step 612, method 600 can include identifying the HOS availability times. In some embodiments, step 612 can include identifying, for a given driver, their HOS cycle over a period of time exceeding the estimated ETA. In some embodiments, the system can store, for each driver, designated HOS cycles or available times.

In step 614, method 600 can include extracting the current cycle time in seconds. In some embodiments, the current cycle time refers to the amount of time left that a driver may operate a vehicle.

In step 616, method 600 can include computing an HOS score. In some embodiments, method 600 determines if the estimated ETA falls within the current cycle time. In some embodiments, step 614 can include a similar windowing technique wherein step 616 includes determining if the estimated ETA falls within a window defined by the current time and the end of the cycle time determined in step 614. That is, if the driver's cycle time will not end before the estimated ETA. In some embodiments, the HOS score can comprise a binary one or zero based on the comparison or a continuous value, like that described in step 608. In another embodiment, the HOS score can comprise a fixed value (e.g., 0.3 or 0.0) based on a binary comparison, like that described in step 608. That is, if the estimated ETA falls within the cycle time, the HOS score may be 0.3 and, if not, 0.0.

In step 620, method 600 can include retrieving historical data of a vehicle. In some embodiments, method 600 can include retrieving all recorded location data points associated with the vehicle during a fixed duration in the past. For example, the last fifteen minutes of location data points can be retrieved.

In step 622, method 600 can include sampling the historical data. In some embodiments, the number of samples can be proportionate to the length of the historical data retrieved. For example, the size of the sample can be configured to obtain a fixed number of samples (e.g., a five-minute sample period for fifteen minutes of location data yields three location data points).

In step 624, method 600 can include identifying a compass bearing direction with respect to the latitude and longitude of the destination of the vehicle. In some embodiments, the destination of the vehicle can comprise a pre-set destination of a trip being performed by the vehicle. In some embodiments, the compass bearing is represented as an angle between two latitude and longitude pairs and can be represented as a value between 0 degrees and 360 degrees. In some embodiments, method 600 can also compute a bearing based on the current position and the destination of the vehicle. In some embodiments, step 624 is executed for each sampled historical location as well as the current location.

In step 626, method 600 can include determining, for each historical point, if the compass bearing matches the compass bearing of the current position.

In one embodiment, step 626 can comprise determining if at least one component of a NSEW direction matches between historical data points and a current position.

In some embodiments, method 600 can calculate bearing and distance between two geographic points. In some embodiments, method 600 can compute a linear line between a given point and the destination, which is not the actual (e.g., real-world) route or path and, hence, the calculated distance or bearing is not completely accurate, but often a good approximation. For example, for a given historical (or current) point, method 600 can compute the angle between the point and the destination (on a linear line represented by the Haversine formula) and use this bearing as the computed bearing for a given point. In these embodiments, method 600 can calculate the bearing between a vehicle location and destination and compare it with the actual bearing metric emitted by the vehicle. In an embodiment, since the vehicle is moving along a route which is different from the linear line of the Haversine formula, an acceptable error limit can be introduced. For example, if a historical compass bearing with respect to the destination of the vehicle is SW, and the current compass bearing of the same vehicle at a current position with respect to the destination of the vehicle is NW, both directions share a common westward direction, so step 626 will determine the compass bearing of the positions in a similar direction. In some embodiments, a Haversine formula with a spherical bearing can be used in lieu of a linear bearing.

In another embodiment, an OSRM library can be used to compute route directions. In an embodiment, method 600 can include using OSRM Routing APIs to fetch a particular route, and method 600 can use it to fit the geographic points. Specifically, method 600 can use the OSRM Route API and provide a latitude and longitude, and bearing (computed using the above embodiments) to see if a particular optimized route can be fetched. The OSRM Routing API also returns the distance and/or duration of said route. In some embodiments, method 600 can sample the vehicle's location and call the OSRM Routing API for these location points to get multiple route responses. Then method 600 can compare the route response distances over time to determine if the distance is decreasing. If the distance is decreasing for multiple sampled points of the vehicle, method 600 can determine, with certain accuracy, that the vehicle is moving towards the destination as the distance is decreasing. If the distance is decreasing, method 600 in step 626 can determine that the direction score (in step 626) should be a match.

In step 626, method 600 can include calculating a direction score from the comparisons made in step 626. In some embodiments, step 626 can comprise determining if all sampled historical compass bearings match the current compass bearing. If so, method 600 determines that the direction matches. If not, method 600 determines that the directions do not match. If the direction matches, method 600 can set the direction score to a first fixed value (e.g., 0.2) and, if not, to a second fixed value (e.g., 0.0).

In step 630, method 600 can include aggregating the ETA score, HOS score, and direction score. If the scores comprise fixed values (e.g., 0.5, 0.3, 0.2, or 0.0, as discussed), step 630 can comprise adding the scores to obtain a total matching score. If the scores comprise continuous values, in some embodiments, step 630 can comprise individually weighting each score to obtain a total matching score.

In step 632, method 600 can include transmitting a response to the client that includes the total matching score. In the various embodiments above, a single vehicle may be processed using method 600, and the response can include the total matching score for the single vehicle. However, in other embodiments, method 600 can be executed for all possible vehicles. In such a scenario, method 600 can return an array of vehicles and their corresponding total matching scores. Further, in some embodiments, method 600 can sort the list of vehicles based on the matching score.

Returning to FIG. 3, in some embodiments, the server can rate-limit the requests in step 304. For example, the server can limit the requests issued in step 304 to one every twelve minutes per broker-fleet pair.

In some embodiments, the response can include a list of all vehicles, sorted by their associated matching score. In some embodiments, the response can also include, for each matching vehicle, the vehicle ID, the ID and name of the driver, and the vehicle's relative distance from the pickup point.

In step 306, method 300 can include starting tracking of a vehicle by subscribing to its location. In some embodiments, step 306 can include issuing an HTTP POST request to the server to begin tracking a given vehicle.

In an embodiment, after a broker receives a list of vehicles best matched to the load pickup needs in step 304, the broker can then create a vehicle tracking event in step 306. In some embodiments, the broker can use this vehicle tracking event to confirm that the vehicle they are tracking will arrive in time.

In an embodiment, the request in step 306 can include either a company ID or DOT ID, similar to the request in step 304. Further, the request in step 306 can include a parameter to identify a vehicle. In some embodiments, the parameter to identify a vehicle can include an explicit vehicle ID (e.g., an ID used by the system to identify vehicles). In some embodiments, the parameter to identify a vehicle can include a name of a vehicle (e.g., an internal ID used by another party such as the fleet or broker to identify the vehicle). In some embodiments, the parameter to identify a vehicle can include a driver ID that identifies a given driver managed by the system.

In some embodiments, the request can also include a start and end time for tracking, where the start time is the earliest time that tracking should begin, and the end time is the estimated load completion time. In some embodiments, the request can also include a load ID for client-side tracking as well as any notes to be passed through as updates come in. In some embodiments, the request can include an initial and a final stop. In some embodiments, the initial and final stop can be used by the server to calculate ETAs throughout the lifecycle of the load. In some embodiments, the request can include optional parameters such as the total distance of the trip for client-side tracking, as well as any kind of trailer ID to track.

In response to the request, the server establishes a subscription for a given vehicle. For example, the server can use a queue system that monitors a database of location data for a given vehicle and pushes data when the location changes, as will be discussed. In some embodiments, the response to the request issued in step 306 can include a subscription ID that can be used to later modify or stop tracking a vehicle.

In step 308, method 300 can include modifying the subscription to change a tracking time.

In some embodiments, step 308 can be executed at any time. In an embodiment, step 308 can include issuing an HTTP PUT request to the server to change the tracking time of the subscription created in step 306. In some embodiments, the request can include an updated start or end time, as discussed above.

In step 310, method 300 can include getting location updates for all subscribed vehicle locations.

After obtaining the subscription ID, method 300 can include getting all live subscriptions by issuing, for example, an HTTP GET request to an endpoint of the API. Using this endpoint, method 300 can get location updates only for the vehicles that are currently within the start- and end-time range for the active loads. In some embodiments, the response to the request in step 310 reiterates the start and end times for the different loads, along with additional details such as the final stop, the vehicle's location, the driver at the time of the update, and more. In some embodiments, the subscription may only be applied to live loads. As new loads fall into the start- and end-time range, they are included in the response for this endpoint. At the same time, as new loads are incorporated, any live load that reaches its endpoint may no longer be included in the subscription updates.

In step 312, method 300 can include getting past locations for a specific vehicle.

In some scenarios, a given broker may request the historical details for a vehicle. In some embodiments, each vehicle includes a gateway device (e.g., an electronic logging device) that stores data locally, so that if a vehicle enters a dead zone, once it is back online, all its location data can be backfilled and then retrieved by accessing an API endpoint of the server. In step 312, a broker can issue a request (e.g., an HTTP GET request) to an endpoint to retrieve a given vehicle's location and many points of additional data, such as its speed, fuel, and odometer readings at various points in time.

In step 314, method 300 can include getting the locations of all assets of a company and their proximity to the LOI.

In some embodiments, step 314 is similar to the description of step 304, and that disclosure is not repeated herein. However, in step 314, method 300 can include tracking an asset rather than a vehicle by using an asset association endpoint of the API. In most systems, assets have their own journeys, sometimes being dropped at a warehouse or shipper facility and then resuming travel, sometimes on different vehicles and with different drivers. In some embodiments, a given asset is associated with an asset gateway that reports (via calling the API) its location.

In step 314, a broker can issue a request (e.g., HTTP GET request) to the server to get a list of all assets of a given company and the assets' proximity to an LOI. In an embodiment, the request can include an ID of the asset via a carrier ID or DOT ID.

In an embodiment, the request can also include a pickup or drop-off location using latitude and longitude or a similar geographic coordinate system. In some embodiments, the server responds to the request by transmitting a list of all assets for the specified carrier, sorted by their proximity to the location of interest. In some embodiments, the response can include asset status, asset attributes, dimensions, license plate information, vehicle attributes, and the asset's relative distance from the LOI. In some embodiments, the request can be rate-limited (e.g., one request every twelve minutes, similar to that discussed previously). In some embodiments, brokers can create subscriptions for individual assets similar to that described in step 306.

In step 316, method 300 can include getting aggregated location updates for all subscribed asset locations.

After a broker subscribes to assets using the subscription endpoint described previously, method 300 can include getting all live subscriptions by issuing, for example, an HTTP GET request to an endpoint of the API. With the API, method 300 can get location updates only for the assets that are currently within the start- and end-time range for the active loads. In some embodiments, the response to the request issued in step 316 can include the start and end times for the different assets, along with additional details such as the final stop, the asset's location, the asset gateway details, and more.

In some embodiments, the server can provide updates for live as sets only. As new assets fall into the start- and end-time range, they may be included in the response for this endpoint. At the same time, as new assets are incorporated, any live asset that reaches its endpoint may no longer be included in the subscription updates.

In the foregoing embodiments, updates can be published to application code (e.g., via webhooks). Thus, by using WebHooks, a broker can enable more complex processing of response data described above.

Figure 4:
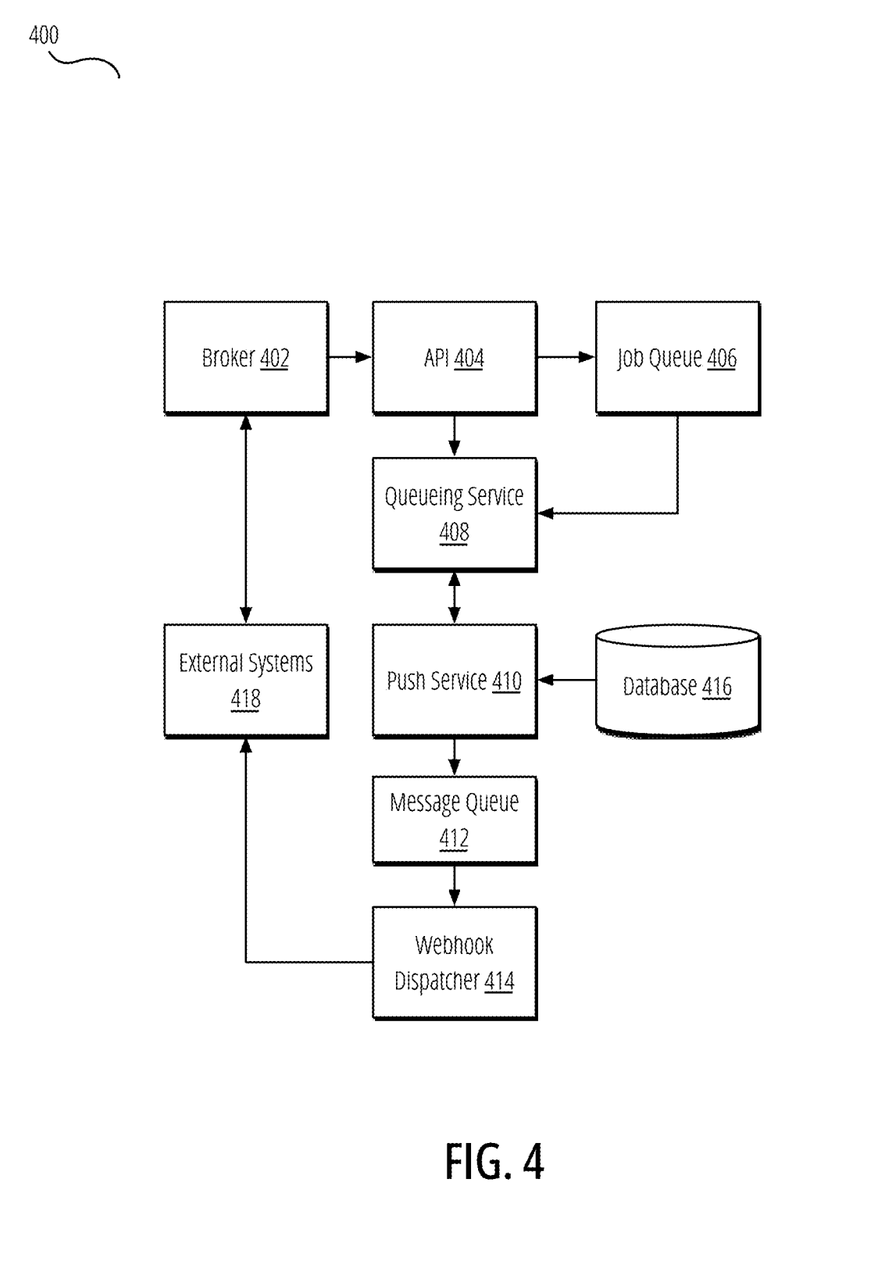
FIG. 4 is a block diagram illustrating a system for publishing updates via a webhook according to some of the example embodiments.

FIG. 4 is a block diagram illustrating a system for publishing updates via a webhook according to some of the example embodiments.

In an embodiment, a broker 402 can request to receive location updates for a subscribed vehicle on their configured endpoint. In some embodiments, this option can be set via an application-level configuration.

The system 400 includes a webhook dispatcher 414 that consumes new messages from a message queue 412 (e.g., an Apache Kafka queue) and writes them to external systems 418 over, for example, Representational State Transfer (REST) endpoints. The system 400 further includes a push service 410, as will be described below.

When configured, and a broker 402 creates a new subscription to track a vehicle (described above, with respect to step 306) via API 404, the system 400 is triggered. Depending on the starting time of the subscription, a message with relevant details is either enqueued in a queuing service 408 (e.g., Amazon Simple Queue Service, SQS) immediately or put in a job queue 406 (e.g., Backburner queue) with a delay such that when the subscription's start time arrives, the message is enqueued in queuing service 408. As such, in some embodiments, the API 404 is configured to route subscription requests to either job queue 406 or queuing service 408 based on the start time of the subscription request.

In an embodiment, the push service 410 polls the queuing service 408 for new messages. As soon as the push service 410 identifies a new message, the push service 410 queries the database 416 for the subscription vehicle's latest location and pushes a message to the message queue 412 with various details about the subscribed vehicle, including its current location. The push service 410 can also then write a new message back in the queuing service 408 after a configured delay. The webhook dispatcher 414 consumes the message written in the message queue 412 and sends the information to the broker 402 over their configured REST endpoint via external systems 418. In some embodiments, the push service 410 picks up the message that was added to the queuing service 408 with a delay, and the process can repeat itself, with updated location details being pushed into the external systems 418 at regular intervals. The loop ends when the subscription period ends or the broker's permission is revoked.

Figure 5:
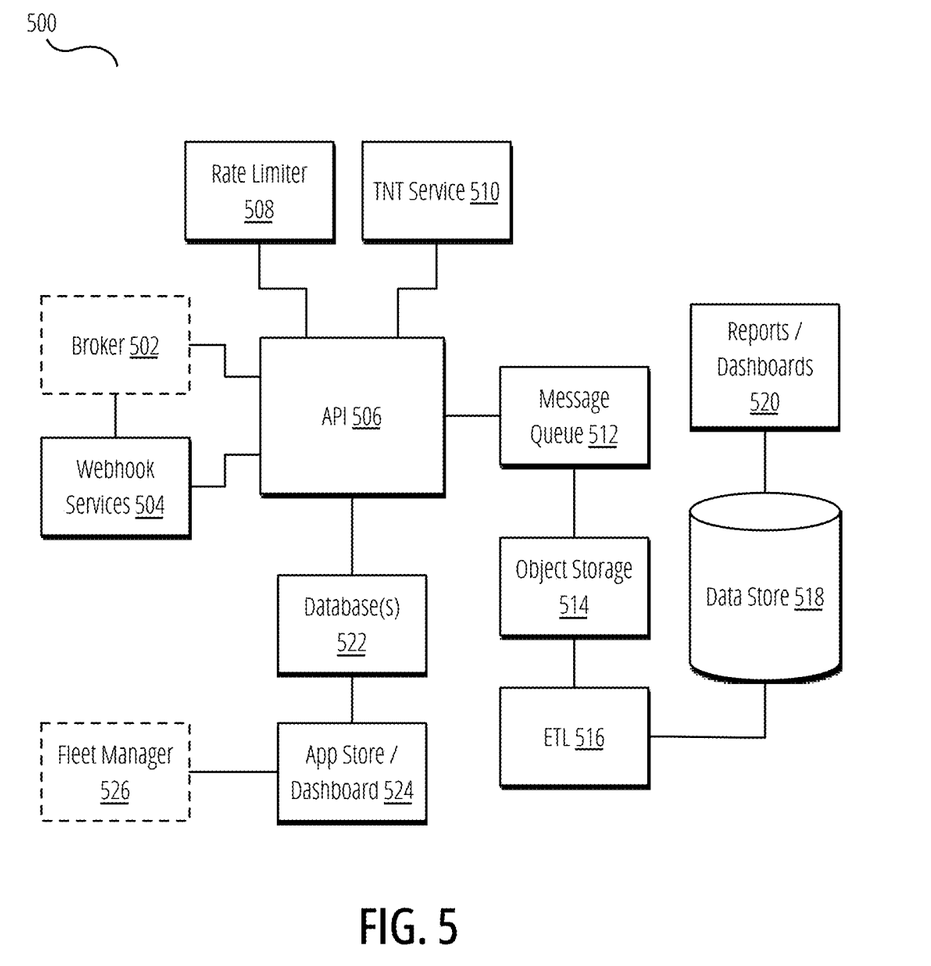
FIG. 5 is a block diagram illustrating a system for providing freight visibility according to some of the example embodiments.

FIG. 5 is a block diagram illustrating a system for providing freight visibility according to some of the example embodiments.

In the illustrated embodiment, the system includes an API 506 that powers all freight visibility operations. A broker 502 can interact directly with the API 506 to track vehicles managed by a fleet manager 526. The broker 502 can create subscriptions via the track and trace (TNT) service 510, which queues messages in message queue 512 for pushing to the broker 502 via webhook services 504. Details of subscriptions and webhooks were provided previously in FIG. 4 and are not repeated herein.

In an embodiment, system 500 includes a rate limiter 508 that monitors requests to the API 506 and limits the broker 502 to a fixed number of requests for both a given endpoint and a given customer for a given period (e.g., one every twelve minutes).

In an embodiment, the API 506 can report metrics of the freight visibility system to the message queue for persistent storage in an object storage system 514 (e.g., Amazon S3). The object storage system 514 can store all data recorded during freight visibility operations and can be processed via extract-transform-load processes (ETL 516) and stored in a data store 518. In some embodiments, the data store 518 can comprise a data lake or similar type of big data storage engine. In an embodiment, a reports and dashboards module 520 can access the data store 518 and generate billing and monitoring reports. In some embodiments, the reports can allow parties to monitor and analyze the brokers' usage patterns and bill them based on usage. Generally, relational databases will not store individual tracking events due to the high volume of these events. Similarly, key-value stores generally will only store temporary data, expiring after a fixed amount of time (e.g., one month). Therefore, the system 500 includes a data pipeline where every API access generates a message containing relevant metrics in message queue 512. The message is then processed asynchronously by streaming jobs, storing the output to object storage system 514. The data from object storage system 514 is then consumed by ETL 516, which transforms the data to the desired formats and move them to the data store 518 for use in reports and dashboards module 520.

The API 506 can also persist data to one or more databases 522. In some embodiments, the databases 522 can include relational databases, key-value databases, and similar types of storage devices. As illustrated, an app store and dashboard component 524 can access the databases to provide insights to a fleet manager 526.

In some embodiments, the fleet managers can have visibility into who was accessing their data and how often through an activity dashboard available in the embedded app marketplace. In some embodiments, a key-value database (e.g., Redis) can be used as the underlying storage in databases 522 for this dashboard. In some embodiments, the key-value store can include three sorted sets. In some embodiments, three sorted sets can be used when the chosen database only supports key-values and simple data structures, rather than columns with indexes on them. In some embodiments, the databases 522 identify the fields on which users can filter data. For each field, the databases 522 add a new sorted set, with the score being the value on which to filter. Transactions can be used to optimize writes to multiple sets for each tracking event. Using this approach, a request to track one hundred vehicles may add only minimal (e.g., 20 milliseconds) latency due to the newly inserted code for capturing metrics. For managing time-to-live (TTL) values at the level of individual items in the set, the databases 522 can use a passive expiry approach. That is, every time a set is accessed, the databases 522 can remove from it all items older than N days. For example, this removal can be performed using Redis's ZREMRANGEBYSCORE command.

Figure 7:
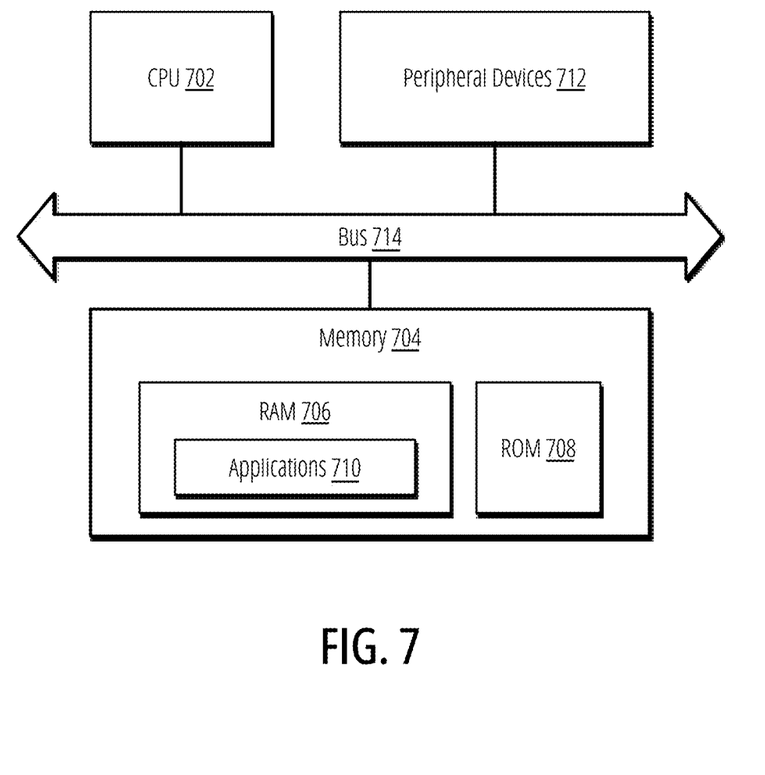
FIG. 7 is a block diagram of a computing device according to some embodiments of the disclosure.

FIG. 7 is a block diagram of a computing device according to some embodiments of the disclosure.

As illustrated, the device includes a processor or central processing unit (CPU) such as CPU 702 in communication with a memory 704 via a bus 714. The device also includes one or more input/output (I/O) or peripheral devices 712. Examples of peripheral devices include, but are not limited to, network interfaces, audio interfaces, display devices, keypads, mice, keyboards, touch screens, illuminators, haptic interfaces, global positioning system (GPS) receivers, cameras, or other optical, thermal, or electromagnetic sensors.

In some embodiments, the CPU 702 may comprise a general-purpose CPU. The CPU 702 may comprise a single-core or multiple-core CPU. The CPU 702 may comprise a system-on-a-chip (SoC) or a similar embedded system. In some embodiments, a graphics processing unit (GPU) may be used in place of, or in combination with, a CPU 702. Memory 704 may comprise a memory system including a dynamic random-access memory (DRAM), static random-access memory (SRAM), Flash (e.g., NAND Flash), or combinations thereof. In one embodiment, the bus 714 may comprise a Peripheral Component Interconnect Express (PCIe) bus. In some embodiments, bus 714 may comprise multiple busses instead of a single bus.

Memory 704 illustrates an example of a non-transitory computer storage media for the storage of information such as computer-readable instructions, data structures, program modules, or other data. Memory 704 can store a basic input/output system (BIOS) in read-only memory (ROM), such as ROM 708, for controlling the low-level operation of the device. The memory can also store an operating system in random-access memory (RAM) for controlling the operation of the device.

Applications 710 may include computer-executable instructions that, when executed by the device, perform any of the methods (or portions of the methods) described previously in the description of the preceding figures. In some embodiments, the software or programs implementing the method embodiments can be read from a hard disk drive (not illustrated) and temporarily stored in RAM 706 by CPU 702. CPU 702 may then read the software or data from RAM 706, process them, and store them in RAM 706 again.

The device may optionally communicate with a base station (not shown) or directly with another computing device. One or more network interfaces in peripheral devices 712 are sometimes referred to as a transceiver, transceiving device, or network interface card (NIC).

An audio interface in peripheral devices 712 produces and receives audio signals such as the sound of a human voice. For example, an audio interface may be coupled to a speaker and microphone (not shown) to enable telecommunication with others or generate an audio acknowledgment for some action. Displays in peripheral devices 712 may comprise liquid crystal display (LCD), gas plasma, light-emitting diode (LED), or any other type of display device used with a computing device. A display may also include a touch-sensitive screen arranged to receive input from an object such as a stylus or a digit from a human hand.

A keypad in peripheral devices 712 may comprise any input device arranged to receive input from a user. An illuminator in peripheral devices 712 may provide a status indication or provide light. The device can also comprise an input/output interface in peripheral devices 712 for communication with external devices, using communication technologies, such as USB, infrared, Bluetooth®, or the like. A haptic interface in peripheral devices 712 provides tactile feedback to a user of the client device.

A GPS receiver in peripheral devices 712 can determine the physical coordinates of the device on the surface of the Earth, which typically outputs a location as latitude and longitude values. A GPS receiver can also employ other geo-positioning mechanisms, including, but not limited to, triangulation, assisted GPS (AGPS), E-OTD, CI, SAI, ETA, BSS, or the like, to further determine the physical location of the device on the surface of the Earth. In one embodiment, however, the device may communicate through other components, providing other information that may be employed to determine the physical location of the device, including, for example, a media access control (MAC) address, Internet Protocol (IP) address, or the like.

The device may include more or fewer components than those shown in FIG. 6, depending on the deployment or usage of the device. For example, a server computing device, such as a rack-mounted server, may not include audio interfaces, displays, keypads, illuminators, haptic interfaces, Global Positioning System (GPS) receivers, or cameras/sensors. Some devices may include additional components not shown, such as graphics processing unit (GPU) devices, cryptographic co-processors, artificial intelligence (AI) accelerators, or other peripheral devices.

The subject matter disclosed above may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, the subject matter may be embodied as methods, devices, components, or systems. Accordingly, embodiments may, for example, take the form of hardware, software, firmware, or any combination thereof (other than software per se). The preceding detailed description is, therefore, not intended to be taken in a limiting sense.

Throughout the specification and claims, terms may have nuanced meanings suggested or implied in context beyond an explicitly stated meaning. Likewise, the phrase "in an embodiment" as used herein does not necessarily refer to the same embodiment, and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and," "or," or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, application-specific integrated circuit (ASIC), or other programmable data processing apparatus, such that the instructions, which execute via the processor of the computer or other programmable data processing apparatus, implement the functions/acts specified in the block diagrams or operational block or blocks. In some alternate implementations, the functions or acts noted in the blocks can occur out of the order noted in the operational illustrations. For example, two blocks shown in succession can in fact be executed substantially concurrently or the blocks can sometimes be executed in the reverse order, depending upon the functionality or acts involved.

These computer program instructions can be provided to a processor of a general purpose computer to alter its function to a special purpose; a special purpose computer; ASIC; or other programmable digital data processing apparatus, such that the instructions, which execute via the processor of the computer or other programmable data processing apparatus, implement the functions or acts specified in the block diagrams or operational block or blocks, thereby transforming their functionality in accordance with embodiments herein.

For the purposes of this disclosure a computer readable medium (or computer-readable storage medium) stores computer data, which data can include computer program code or instructions that are executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable, and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid-state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers or be loaded and executed by one or more servers. One or more modules may be grouped into an engine or an application.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all the features described herein are possible.

Functionality may also be, in whole or in part, distributed among multiple components, in manners now known or to become known. Thus, a myriad of software, hardware, and firmware combinations are possible in achieving the functions, features, interfaces, and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

We claim:

1. A method comprising:
   receiving a network request from a computing device at a first timestamp, the network request including a company identifier, an estimated time of arrival (ETA), and a location of interest (LOI);
   identifying at least one vehicle responsive to the company identifier, the at least one vehicle selected from a database storing data regarding a fleet of in-motion vehicles operated by a company associated with the company identifier;
   computing a first score based on an actual ETA of the at least one vehicle associated with the company identifier, wherein the actual ETA is calculated based on a current Global Positioning System (GPS) location of the at least one vehicle relative to the LOI at the first timestamp;
   computing a second score based on an hours of service value associated with a driver of the at least one vehicle, wherein the hours of service value is computed over a period of time exceeding the estimated ETA;
   computing a third score based on a direction of the at least one vehicle, wherein the direction of the at least one vehicle is computed based on sampling historical GPS locations associated with the at least one vehicle;
   aggregating the first score, second score, and the third score to generate a total matching score for the at least one vehicle;
   returning, as a response to the network request, data representing the at least one vehicle when the total matching score exceeds a threshold;
   automatically initiating, responsive to the total matching score exceeding a threshold, a tracking subscription that routes vehicle location updates through a message queue based on a subscription start time; and
   updating the first score and recalculating the total matching score in response to detecting a location change in the message queue, wherein the updated total matching score determines continuation of the tracking subscription.

2. The method of claim 1, wherein the LOI comprises a latitude and longitude pair.

3. The method of claim 1, wherein computing the first score comprises retrieving an actual ETA of the at least one vehicle using a current location of the at least one vehicle and the LOI, generating a time window using the actual ETA and the current time, determining if the estimated ETA is within the time window, and generating the first score based on determining if the estimated ETA is within the time window.

4. The method of claim 1, wherein computing the second score comprises determining if the actual ETA falls within a cycle time represented in the hours of service of the driver.

5. The method of claim 1, wherein computing the third score comprises:
   retrieving historical location data for the at least one vehicle;
   generating a plurality of compass bearings based on the historical location data;
   comparing each of the plurality of compass bearings to a current compass bearing of the at least one vehicle; and
   using results of the comparing to generate the third score.

6. The method of claim 5, wherein generating a plurality of compass bearings based on the historical location data comprises sampling the historical location data to obtain a set of coordinates data and generating the plurality of compass bearings based on the set of coordinates.

7. The method of claim 5, wherein generating a plurality of compass bearings based on the historical location data comprises computing the plurality of compass bearings based on linear lines between respective vehicle locations and the LOI.

8. The method of claim 5, wherein generating a plurality of compass bearings based on the historical location data comprises using an Open Source Routing Machine (OSRM) API to compute distances between coordinates in the historical location data and coordinates of a destination and determining if the at least one vehicle is moving toward the LOI.

9. A non-transitory computer-readable storage medium for tangibly storing computer program instructions capable of being executed by a computer processor, the computer program instructions defining steps of:
   receiving a network request from a computing device at a first timestamp, the network request including a company identifier, an estimated time of arrival (ETA), and a location of interest (LOI);
   identifying at least one vehicle responsive to the company identifier, the at least one vehicle selected from a database storing data regarding a fleet of in-motion vehicles operated by a company associated with the company identifier;

computing a first score based on an actual ETA of the at least one vehicle associated with the company identifier, wherein the actual ETA is calculated based on a current Global Positioning System (GPS) location of the at least one vehicle relative to the LOI at the first timestamp;

computing a second score based on an hours of service value associated with a driver of the at least one vehicle, wherein the hours of service value is computed over a period of time exceeding the estimated ETA;

computing a third score based on a direction of the at least one vehicle, wherein the direction of the at least one vehicle is computed based on sampling historical GPS locations associated with the at least one vehicle;

aggregating the first score, second score, and the third score to generate a total matching score for the at least one vehicle;

returning, as a response to the network request, data representing the at least one vehicle when the total matching score exceeds a threshold;

automatically initiating, responsive to the total matching score exceeding a threshold, a tracking subscription that routes vehicle location updates through a message queue based on a subscription start time; and updating the first score and recalculating the total matching score in response to detecting a location change in the message queue, wherein the updated total matching score determines continuation of the tracking subscription.

10. The non-transitory computer-readable storage medium of claim 9, wherein the LOI comprises a latitude and longitude pair.

11. The non-transitory computer-readable storage medium of claim 9, wherein computing the first score comprises retrieving an actual ETA of the at least one vehicle using a current location of the at least one vehicle and the LOI, generating a time window using the actual ETA and the current time, determining if the estimated ETA is within the time window, and generating the first score based on determining if the estimated ETA is within the time window.

12. The non-transitory computer-readable storage medium of claim 9, wherein computing the second score comprises determining if the estimated ETA falls within a cycle time represented in the hours of service of the driver.

13. The non-transitory computer-readable storage medium of claim 9, wherein computing the third score comprises:
retrieving historical location data for the at least one vehicle;
generating a plurality of compass bearings based on the historical location data;
comparing each of the plurality of compass bearings to a current compass bearing of the at least one vehicle; and
using results of the comparing to generate the third score.

14. The non-transitory computer-readable storage medium of claim 13, wherein generating a plurality of compass bearings based on the historical location data comprises sampling the historical location data to obtain a set of coordinates and generating the plurality of compass bearings based on the set of coordinates.

15. The non-transitory computer-readable storage medium of claim 13, wherein generating a plurality of compass bearings based on the historical location data comprises computing the plurality of compass bearings based on linear lines between respective vehicle locations and the LOI.

16. The non-transitory computer-readable storage medium of claim 13, wherein generating a plurality of compass bearings based on the historical location data comprises using an Open Source Routing Machine (OSRM) API to compute distances between coordinates in the historical location data and coordinates of a destination.

17. A device comprising:
a processor configured to:
receive a network request from a computing device at a first timestamp, the network request including a company identifier, an estimated time of arrival (ETA), and a location of interest (LOI);
identify at least one vehicle responsive to the company identifier, the at least one vehicle selected from a database storing data regarding a fleet of in-motion vehicles operated by a company associated with the company identifier;
compute a first score based on an actual ETA of the at least one vehicle associated with the company identifier, wherein the actual ETA is calculated based on a current Global Positioning System (GPS) location of the at least one vehicle relative to the LOI at the first timestamp;
compute a second score based on an hours of service value associated with a driver of the at least one vehicle, wherein the hours of service value is computed over a period of time exceeding the estimated ETA;
compute a third score based on a direction of the at least one vehicle, wherein the direction of the at least one vehicle is computed based on sampling historical GPS locations associated with the at least one vehicle;
aggregate the first score, second score, and the third score to generate a total matching score for the at least one vehicle;
returning, as a response to the network request, data representing the at least one vehicle when the total matching score exceeds a threshold;
automatically initiate, responsive to the total matching score exceeding a threshold, a tracking subscription that routes vehicle location updates through a message queue based on a subscription start time; and
update the first score and recalculating the total matching score in response to detecting a location change in the message queue, wherein the updated total matching score determines continuation of the tracking subscription.

18. The device of claim 17, wherein computing the first score comprises retrieving an actual ETA of the at least one vehicle using a current location of the at least one vehicle and the LOI, generating a time window using the actual ETA and the current time, determining if the estimated ETA is within the time window, and generating the first score based on determining if the estimated ETA is within the time window.

19. The device of claim 17, wherein computing the second score comprises determining if the estimated ETA falls within a cycle time represented in the hours of service of the driver.

20. The device of claim 17, wherein computing the third score comprises:
retrieving historical location data for the at least one vehicle;
generating a plurality of compass bearings based on the historical location data;

comparing each of the plurality of compass bearings to a current compass bearing of the at least one vehicle; and
using results of the comparing to generate the third score.

\* \* \* \* \*